United States Patent [19]

Gabano et al.

[11] 4,271,244

[45] Jun. 2, 1981

[54] HIGH SPECIFIC ENERGY BATTERY HAVING AN IMPROVED POSITIVE ACTIVE MATERIAL

[75] Inventors: Jean-Paul Gabano; Michel Broussely, both of Poitiers, France

[73] Assignee: Saft-Societe des Accumulateurs Fixes et de Traction, Romainville, France

[21] Appl. No.: 87,926

[22] Filed: Oct. 25, 1979

Related U.S. Application Data

[63] Continuation of Ser. No. 942,292, Sep. 14, 1978, abandoned.

[51] Int. Cl.$^3$ .............................................. H01M 6/16
[52] U.S. Cl. ..................................... 429/197; 429/228
[58] Field of Search ...................... 429/194, 228, 197

[56] References Cited

U.S. PATENT DOCUMENTS

| | | | |
|---|---|---|---|
| 2,937,219 | 5/1960 | Minnick et al. | 429/196 |
| 4,018,970 | 4/1977 | Jamel et al. | 429/194 |
| 4,048,402 | 9/1977 | Kronenberg | 429/194 |
| 4,048,403 | 9/1977 | Kronenberg | 429/194 |
| 4,049,892 | 9/1977 | Kronenberg | 429/194 |

OTHER PUBLICATIONS

Bode, Lead-Acid Batteries, John Wiley & Sons, 1977.

*Primary Examiner*—Donald L. Walton
*Attorney, Agent, or Firm*—Kenyon & Kenyon

[57] ABSTRACT

A battery having a lithium anode, an electrolyte solution in which the solvent is an aprotic composition, and cathode in which the positive active material is formed from particles of a lead oxide having the formula $PbO_x$, where x has values from 1.5 to 1.87. The $PbO_x$ positive active material produces a battery with a high specific energy and a single discharge level.

8 Claims, 2 Drawing Figures

HIGH SPECIFIC ENERGY BATTERY HAVING AN IMPROVED POSITIVE ACTIVE MATERIAL

This is a continuation of application Ser. No. 942,292 filed Sept. 14, 1978, and now abandoned.

BACKGROUND OF THE INVENTION

1. Field of the Invention

The present invention relates to high specific energy batteries having an alkali metal, preferably lithium, as a negative active material and relates particularly to a positive active material for such a battery.

2. Discussion of the Prior Art

Since at least 1960 it has been proposed to use oxides of lead as the positive active material for batteries in which the negative active material is lithium, among others. See, for example, U.S. Pat. No. 2,937,219 issued to L. J. Minnick et al. on May 17, 1960. More recently, U.S. Pat. No. 4,018,970, issued to Yves Jumel et al. on Apr. 19, 1977, and commonly assigned with this application, has described lithium batteries of which the positive active material is composed of lead oxides having the formula PbO or $Pb_3O_4$. The disclosure of the latter patent is incorporated herein by reference.

It would be desirable, however, to use lead peroxide, $PbO_2$, as a positive active material because it has a theoretical specific capacity that is higher than that of $Pb_3O_4$ and even more superior to that of PbO. Lead peroxide has also been proposed as a positive active material in the above-mentioned Minnick et al. U.S. Pat. No. 2,937,219. However, lead peroxide has the disadvantage of discharging over two steps or levels, which is an inconvenience in many cases.

SUMMARY OF THE INVENTION

It is an object of the present invention to provide an electrochemical generator in which the positive active material has a higher specific capacity than that of minium (i.e., red lead), $Pb_3O_4$, while at the same time having only a single discharge level.

It is a more specific object of the invention to provide an electrochemical generator in which the negative active material is lithium, the electrolyte is a solution of which the solvent is an aprotic composition, and the positive active material is an oxide of lead having the formula $PbO_x$, where x has a value between 1.4 and 1.87.

One such positive active material can be obtained by the controlled reduction of lead peroxide, $PbO_2$, for example by means of appropriate thermal treatment. Upon the reduction of $PbO_2$, as long as x remains equal to or greater than 1.87, the $PbO_x$ composition retains the crystalline structure of $PbO_2$ and behaves as a single nonstoichiometric phase. As soon as x falls below a value of 1.87, the characteristic lines of $Pb_2O_3$ appear in the X-ray spectrogram of the material. In this region, the material apparently comprises an amalgamation of $Pb_2O_3$ and $PbO_2$. Proceeding with further reduction, when x=1.5, the composition of $PbO_x$ is essentially $Pb_2O_3$, and for x less than 1.5, the material becomes an amalgamation of $Pb_2O_3$ and $Pb_3O_4$.

The positive active material according to the invention therefore can be identified by the presence in its X-ray spectrogram of $Pb_2O_3$ lines, with an intensity greater or less according to whether x is closer or farther away from the value of 1.5, this being true for every particle of the positive active material or at least for a substantial part of them.

With a positive active lead oxide material having these characteristics, discharge of a battery occurs at a single level. On the contrary, if a positive active material for the battery is prepared by mixing, for example, particles of the lead oxides $PbO_2$ and $Pb_3O_4$, the separate particles of the single phase $PbO_2$ in the mixture will cause the two-level discharge referred to earlier.

Preferably, the upper limit for x in the $PbO_x$ composition of this invention is approximately 1.8, this value being easier to obtain homogeneously by thermal treatment of $PbO_2$. As illustrative examples, $PbO_{1.8}$ has been obtained by heating $PbO_2$ at 380° C. for 30 minutes, and $PbO_{1.5}$ by heating $PbO_2$ at 390° C. for two hours. Of course, the time of heating at a given temperature to obtain a given composition depends on the granularity of the material, apart from other operating conditions.

The manner of using the positive active material according to this invention in a battery is analogous to that described in the above-mentioned U.S. Pat. No. 4,018,970. Thus, an electronic conductor is mixed with the active material, the conductor being selected from the group comprising lead, zinc, tin, gold, bismuth, cadmium, and their alloys, the three first-mentioned metals being preferred.

The electrolyte is a solution of which the solvent may be an ether, an ester, or a mixture of ethers and esters. Among the suitable ethers are dioxolane, tetrahydrofuran, dimethoxyethane, or mixtures of them. Suitable esters include methyl formate, dimethyl sulfite, propylene carbonate, ethylene carbonate, and their mixtures. It should be noted, however, that since the oxides of lead may be barely soluble in certain esters, these esters should be used with precautions, for example in energizable batteries.

The solute of the electrolyte is preferably a lithium salt, such as lithium perchlorate. Other lithium salts that may be equally suitable include lithium tetrafluoborate, lithium fluoromethyl sulfonate ($LiCF_3SO_3$), and lithium hexafluoroarsenate.

The invention can be better understood with the aid of the following examples, as illustrated by the accompanying drawings.

DESCRIPTION OF THE PREFERRED EMBODIMENTS

Three test batteries have been constructed having nearly identical positive active material. The batteries are of the conventional button type, with an exterior diameter of 11.6 mm and an overall height of 5.4 mm. The casing is formed from two cups of nickel steel separated by a gasket that serves both as a seal and as an electrical insulator between the cups. The negative cup contains lithium in the form of a foil coated onto a nickel steel collector screen that is soldered or otherwise electrically bonded to the negative cup. The positive cup contains the positive active mass, and a separator formed of multiple layers of paper and cellulose felt saturated with electrolyte is disposed between the lithium and the positive mass. The electrolyte is a 2 molar solution of lithium perchlorate in dioxolane.

The composition of the positive active mass in each of the three test cells was as follows: 9 grams of lead oxide, $PbO_x$; 2.84 grams of lead powder; and 0.50 gram of polytetrafluorethylene (PTFE). The total was mixed, sifted, and then compressed into the positive cup under a pressure of 1.5 tons/cm$^2$, the quantity of the positive mass being such that the resulting height of the cathode was about 1.35 mm. The amount of material and the pressure used to form each positive active mass was the same for each of the three test cells. Thus, the only difference between the cells was in the oxide of lead, $PbO_x$, used therein.

The first cell, A, used minium, $Pb_3O_4$ ($x = 1.33$), which corresponds to the prior art positive material described in the above-mentioned U.S. Patent No. 4,018,970. The second cell, B, used lead sesquioxide, $Pb_2O_3$ ($x = 1.5$), and the third cell, C, used a nonstoichiometric plumbate, $PbO_{1.8}$ ($x = 1.8$). Thus, cells B and C contained the improved positive active material according to the present invention.

Figure 1:
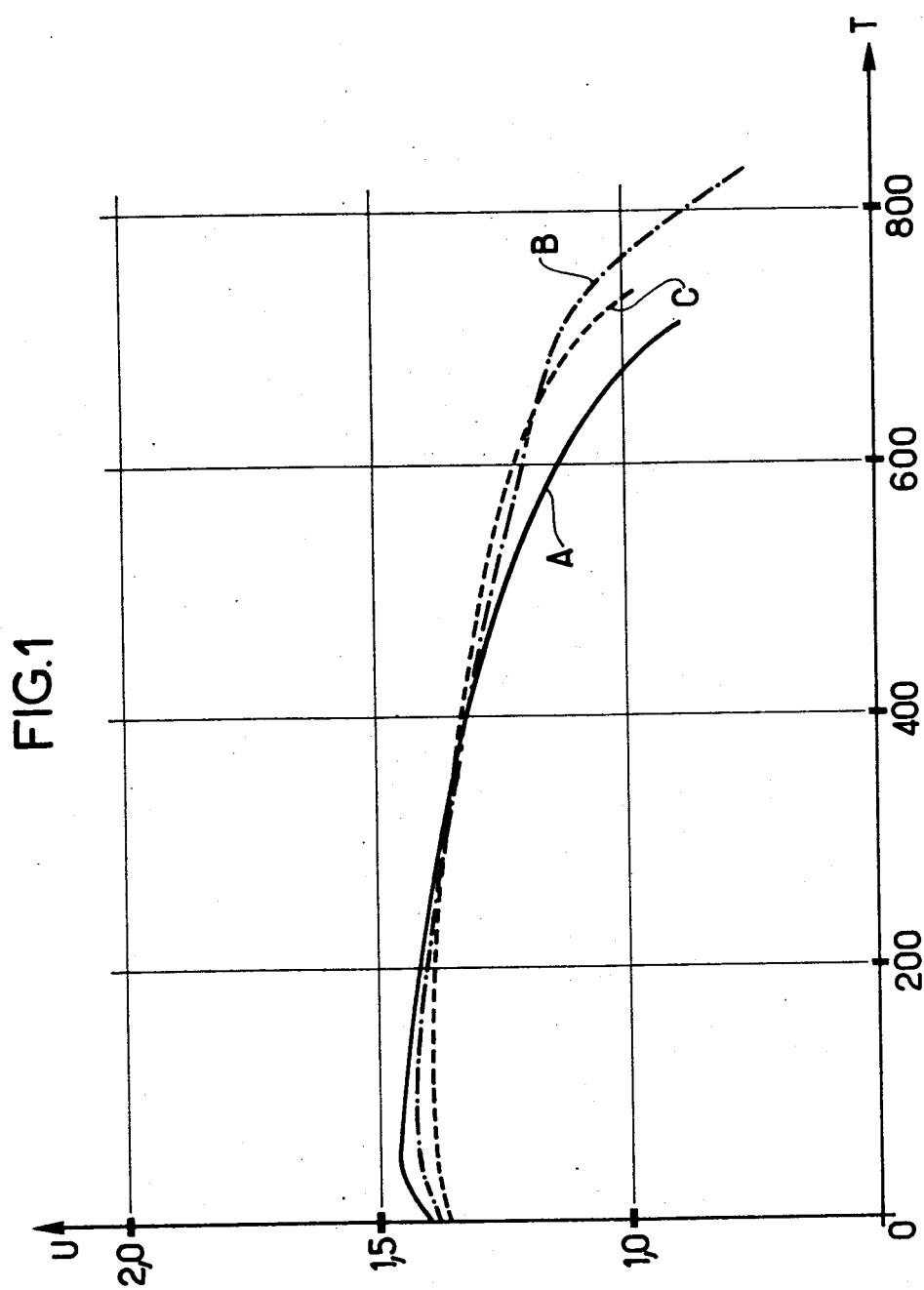
FIG. 1 is a comparison graph of discharge voltage, U, versus time, T, for three freshly made batteries, one battery, A, according to the prior art and two batteries, B and C, according to the present invention.
Figure 2:
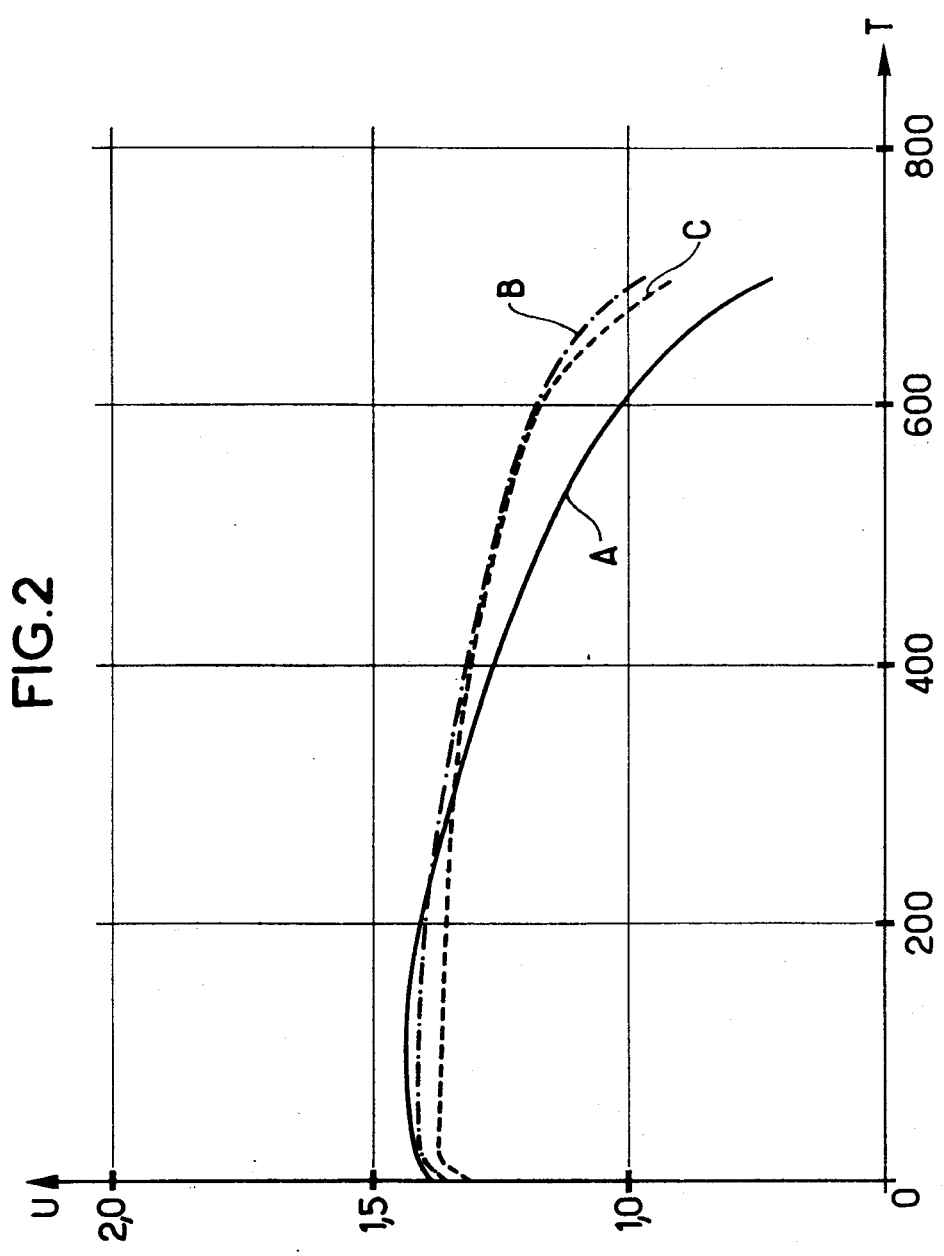
FIG. 2 is a graph similar to FIG. 1 showing the discharge curves of three batteries after aging for one month.

FIG. 1 shows the discharge curves for each of three freshly made test cells A, B, and C through a resistance of 5000 ohms, each curve being identified by the letter of the cell composition, as described above. FIG. 2 shows corresponding discharge curves for test cells that, prior to discharge, were stored for one month at a temperature of 45° C. On each figure the cell output, U, is indicated on the ordinate in volts, and the discharge time, T, is shown on the abscissa in hours.

The table below presents the theoretical capacities, the capacities in the fresh state (stop voltage, 2 volts), and the capacities after a one-month aging period of the three test cells. From the latter two figures the actual output and the loss in output due to aging have been calculated as a percentage of the theoretical output.

| Cell | Theor. Cap mAh | Cap (Fresh) mAh | Output (Fresh) % | Cap (Aged) mAh | Output (Aged) % | Loss from Aging % |
| --- | --- | --- | --- | --- | --- | --- |
| A | 148 | 145 | 98 | 124 | 84 | 14,5 |
| B | 185 | 163 | 88 | 157 | 85 | 3,7 |
| C | 221 | 163 | 74 | 155 | 70 | 5 |

It can be seen from the Figures and the table that, if the minium ($Pb_3O_4$) of the positive mass in cell A provides the best output in the fresh state, the lead sesquioxide ($Pb_2O_3$) of cell B is superior in maintaining capacity over time. Furthermore, it can be seen clearly from the figures that for a constant volume and assembly pressure for each cell, the capacities of cells B and C according to the invention are larger than the capacity of cell A and that the voltage of cells B and C remains more nearly constant during discharge. The voltage of cell A, after starting out above the voltages of B and C at the beginning of discharge, falls below them by the end of the discharge time.

It will be appreciated, of course, that the invention is not limited to the embodiments described above, which are given only by way of illustration.

We claim:
1. A battery having a negative electrode composed of lithium, an electrolyte solution of which the solvent is an aprotic composition, and a positive electrode including a positive active material composed of an oxide of lead having the formula $PbO_x$, wherein the improvement comprises said positive active material being composed of uniformly homogeneous particles of an oxide of lead wherein x is within the range of 1.5 to 1.87.
2. A battery according to claim 1 wherein the upper limit of x is approximately 1.8.
3. A battery according to claim 2 wherein x is in the neighborhood of 1.5.
4. A battery according to claim 1 wherein the positive active material further comprises an electronic conductor.
5. A battery according to claim 4 wherein the electronic conductor is selected from the group consisting of lead, zinc, tin, gold, bismuth, cadmium, and their alloys.
6. A battery according to claim 1 wherein the aprotic solvent of the electrolyte is selected from the group consisting of dioxolane, tetrahydrofuran, dimethoxyethane, methyl formate, dimethyl sulfate, propylene carbonate, ethylene carbonate, and their mixtures.
7. A battery according to claim 1 or 6 wherein the solute of the electrolyte is a lithium salt selected from the group consisting of lithium perchlorate, lithium tetrafluoborate, lithium fluoromethyl sulfonate, and lithium hexafluoroarsenate.
8. A battery having a negative electrode composed of lithium, an electrolyte solution of which the solvent is an aprotic composition, and a positive electrode including a positive active material composed of an oxide of lead having the formula $PbO_x$, wherein the improvement comprises said oxide of lead, $PbO_x$, being obtained by heating particles of lead peroxide, $PbO_2$, at about 380° C.–390° C. to produce uniformly homogeneous particles wherein the value of x is between 1.5 and 1.87.

* * * * *

UNITED STATES PATENT AND TRADEMARK OFFICE
CERTIFICATE OF CORRECTION

PATENT NO. : 4,271,244
DATED : 2 June 1981
INVENTOR(S) : JEAN-PAUL GABANO and MICHEL BROUSSELY It is certified that error appears in the above—identified patent and that said Letters Patent is hereby corrected as shown below:

Column 4, line 36: change "sulfate" to --sulfite--.

Column 4, line 41: change "tetrafluoborate" to --tetrafluoroborate--.

Signed and Sealed this

Twenty-fifth Day of August 1981

[SEAL]

Attest:

Attesting Officer

GERALD J. MOSSINGHOFF

Commissioner of Patents and Trademarks